United States Patent
Thoma

(10) Patent No.: US 8,074,358 B2
(45) Date of Patent: Dec. 13, 2011

(54) METHOD FOR THE PRODUCTION OF PANEL-TYPE COMPONENTS

(76) Inventor: Erwin Thoma, St. Johann/Pongau (AT)

( * ) Notice: Subject to any disclaimer, the term of this patent is extended or adjusted under 35 U.S.C. 154(b) by 179 days.

(21) Appl. No.: 12/310,475

(22) PCT Filed: Sep. 5, 2007

(86) PCT No.: PCT/EP2007/059281
§ 371 (c)(1),
(2), (4) Date: Feb. 26, 2009

(87) PCT Pub. No.: WO2008/028925
PCT Pub. Date: Mar. 13, 2008

(65) Prior Publication Data
US 2010/0021674 A1    Jan. 28, 2010

(30) Foreign Application Priority Data
Sep. 6, 2006  (AT) ................ A 1489/2006

(51) Int. Cl.
| B21D 47/00 | (2006.01) |
| B21K 23/00 | (2006.01) |
| B23P 19/00 | (2006.01) |
| B23P 19/12 | (2006.01) |

(52) U.S. Cl. ........... 29/897; 29/897.32; 29/446; 29/525; 29/525.01; 403/408.1; 144/344; 144/353

(58) Field of Classification Search ............ 29/897, 29/897.32, 525, 525.01, 446; 403/408.1, 403/292, 388; 411/339, 351; 144/344, 353, 144/354
See application file for complete search history.

(56) References Cited

U.S. PATENT DOCUMENTS

| 3,883,258 A * | 5/1975 | Hewson ............... 403/298 |
| 4,474,493 A | 10/1984 | Welch |
| 5,033,904 A * | 7/1991 | Challis ............... 403/292 |
| 5,061,113 A * | 10/1991 | Vives ............... 403/408.1 |
| 6,533,005 B2 * | 3/2003 | Hill ............... 144/350 |
| 6,534,143 B1 * | 3/2003 | Thoma ............... 428/44 |

FOREIGN PATENT DOCUMENTS

| DE | 29918118 | 4/2000 |
| DE | 19925644 C1 * | 8/2000 |
| JP | 2000064436 | 2/2000 |
| SU | 1025831 | 6/1981 |
| WO | 2007028187 | 3/2007 |
| WO | 2008028925 | 3/2008 |

OTHER PUBLICATIONS

English Abstract of W02008028925.
English Abstract of W02007028187.
English Abstract of JP2000064436.

* cited by examiner

*Primary Examiner* — Jermie Cozart
(74) *Attorney, Agent, or Firm* — Dykema Gossett PLLC

(57) ABSTRACT

A method for the production of panel-type components having at least three layers of boards disposed parallel to the plane of the component, with the boards being connected to one another without glue by dowels extending substantially transversely to the plane of the component, includes disposing a plurality of layers of boards on top of each other in different orientations, providing a plurality of bores in these boards which penetrate the layers, and pressing dowels into the bores. An especially high strength is achieved by tensioning layers of the boards during drilling and insertion of the dowels, the tensioning including applying compressive forces. Also, the dowels are preferably compacted in a radial direction before insertion in the bores.

11 Claims, 4 Drawing Sheets

METHOD FOR THE PRODUCTION OF PANEL-TYPE COMPONENTS

BACKGROUND OF THE INVENTION

1. Field of the Invention

The invention relates to a method for the production of panel-type components having at least three layers of boards disposed parallel to the plane of the component, the boards being connected to one another without glue by dowels extending substantially transversely to the plane of the component, with firstly a plurality of layers of boards being disposed on top of each other in different orientations, a plurality of bores being provided in these boards which penetrate the layers, and the dowels being pressed into the bores.

2. The Prior Art

It is known to connect wood components by dowels. It is possible in this context to produce wall elements or the like made from one material, which means that the connection of the individual components among each other occurs exclusively through the frictional connection of the components with the dowels. Examples of walls elements produced in this manner are provided in EP 1 097 032 A or EP 1 381 740 of the applicant. If no glue is to be used in the dowel joint, as is required for ecologically high-value components, it is necessary to produce the respective holding forces via the frictional connection between the dowels and the components from which the components are made. This can occur in the known manner in such a way that dowels are used which have a diameter which is larger than the bore that are determined for receiving the dowel. There are limits to hammering or pressing in such dowels however. A further possibility of improving the frictional connection is that wedges or the like are driven into the face-side ends of the dowels. This comes with the disadvantage however that the frictional connection is improved in this case not over the entire length of the dowel, but only in the area of the wedges. There is a further disadvantage in that when the surface is machined which leads to reduction in the thickness of the components especially the especially supporting parts of the dowel are removed, leading to an impairment in the quality of the joint.

It is known from "innovations in wood" in the "Forum Planning June 2003" to produce wood elements by dowel joints, with the dowels being compressed in the radial direction prior to being driven in. The dowels are pressed in a rotating manner through a conically tapering opening, so that the glue grooves, if any, are flattened to a substantial extent. Although it is possible with such a dowel to improve hold even in case of humidity changes of the component, the security to be gained is not sufficient for all applications.

U.S. Pat. No. 4,474,493 A shows a dowel for producing joints between components with a slit arranged in a screw-like manner. It is usually not possible with such a dowel to produce components made of a single material. Moreover, the forces that can be transmitted by such a dowel are limited.

JP 2000-064436A shows a dowel which is compressed prior to being driven in and increases its volume by taking up humidity. In order to achieve a secure hold, a relatively strong compression needs to be performed, which under adverse conditions may lead to damage to components.

DE 299 18 118 A shows a wood production component which is connected by dowels which are arranged parallel to the panel plane. When there is a bending load, the tensions occurring in the component are absorbed only by the dowels in the worst case. Such a component is therefore not very strong.

A solution is known from SU 1 025 831 A in which individual boards are arranged perpendicular to the plane of stacks of boards. The dowels are used to maintain an applied tensioning. The dowels are subjected to shearing strain. The components thus arranged are primarily suitable as supports, but not to provide planar components.

It is the object of the present invention to further develop a method of the kind mentioned above that a sturdy component with high loading capacity is created which is insensitive to the various humidity influences and offers high heat insulation values and high leak-tightness.

SUMMARY OF THE INVENTION

It is provided in accordance with the invention that the layers of the boards, during drilling and insertion of the dowels, are tensioned against each other by applying compressive forces and that the dowels are preferably compacted in the radial direction before insertion. Boards within the terms of the present invention are timber which is suitable to be joined into panel-type components, which also includes timber which is generally designated as posts. The relevant aspect in the present invention is that the individual boards are tightly held during the doweling not only in their position but also tensioned against each other in the axial direction, i.e., perpendicular to the plane of the board. This tensioning causes a certain deformation of the boards in the direction of thickness, which leads to the consequence that after driving in the dowel, a state of tension is maintained. When shearing forces now occur between the individual layers of the component, as is regularly the case for example under a bending load or during the occurrence of shearing forces in the plane of the board which leads to a parallelogram-like displacement of the element, such shearing forces are not absorbed in a primarily positive-locking manner by the dowels, but to a substantial extent by the frictional forces between the individually layers, which are caused by the inner tension states. In this way, shearing forces are distributed over the entire surface area and the loading capability and stiffness of the component will be improved substantially.

The compression of the wood dowel can occur for example by three pressing rollers which are offset by 120°. It is provided that at least three profiled drive rollers are arranged about the circumference of a cylindrical spatial area in an approximately similar way for receiving a dowel, with the drive rollers each being held to rotate about an axis and the axes being arranged in a skewed way relative to and in a normal plane on the axis of the cylindrical spatial area.

The mechanical compression is achieved in this case in such a way that the milled dowel passes through a press in which three or more pressing rollers with a concave curved profile are arranged, with the pressing rollers compressing the dowel in the direction of the diameter. The profile can be semicircular or also parabolic in the cross section. The radius of curvature as measured at the apex of the profile should correspond to the radius of the compressed dowel.

The tensioning of the boards in the above sense is required in any case during the doweling locally in the area of the dowel that is respectively driven in. It is advantageous to apply a certain tensioning during the drilling in order to no longer substantially influence the geometry of the bores prior to doweling. It is certainly possible to apply a low pressure in a planar way during the drilling and to increase tensioning in the course of driving in the dowel. This additional tensioning can certainly occur locally in the area of the respective dowel to be driven in, i.e. in regions where a mutual influence can be assumed.

It is similarly not necessary to tension the entire component prior to doweling. It is certainly sufficient and even preferable when only those areas of the component are tensioned in which the dowels are pressed. This reduces the overall required forces and promotes rapid work progress.

It is especially advantageous when the compressive forces applied to the boards cause a surface pressing which is at least so large that the individual boards of adjacent layers lie one top of one another in an approximately planar way. The boards which are used in the production of components in accordance with the invention are usually not ideally prismatic, but are warped or curved in different ways. In this context, one can observe curvatures transverse to the direction of the wood fiber, screw-like twisting and irregular warping. When tensioning has increased to such an extent that it is ensured that the individual boards can lie in a planar fashion on top of each other, the required inner tension state of the component is caused by the reaction forces of the individual boards which intend to produce the original shape of the individual boards again. After driving in the dowels, they are subjected to tension in the longitudinal direction and generate the compressive forces described above. The fact is also advantageous in this connection that in this way relatively planar external surfaces are achieved already directly after the doweling, i.e. in the raw state of the component. It is then only necessary to remove material in the amount of a few millimeters in completing the components, in which they are planed down in order to achieve high surface quality and a completely planar surface. This not only accelerates the production process as a result of the reduced duration of the planing process, but also leads to an only minimal weakening of the cover layers. In the case of major warping of the outer surface, locally high removal rates would be required which could lead to a statically critically weakening of the cover layers.

Usually, the compression in the direction of thickness of the component will be between 5% and 8% of the thickness of the element. In the case of starting material of very high quality that has only very little warpage, one can make do with lower pressings of between 3% and 5%. It is conversely possible that in the case of extremely warped timber, a reduction in the thickness of 15% or more is necessary.

The production of layers that lie in a planar fashion on top of each other comes with the additional advantage, in addition to the static advantages as described above, that large-volume cavities in the interior of the components can securely be prevented, so that deteriorating heat insulation values as a result of internal convection flows can be securely prevented.

A substantial increase in the transferable forces can be achieved as a result of additional elastic deformation in the direction of thickness in such a way that the compressive forces applied to the boards cause a surface pressing which is at least twice as large as it would be required that the individual boards of adjacent layers would approximately lie in a planar fashion on top of each other.

A further essential criterion for the necessary strength of the tensioning is given in such a way that the total force of the tensioning is larger than half the sum total of forces which are applied to driving in the dowel.

Typically, the pressing in of dowels with a diameter of 20 mm can occur with forces which can be up to 20 kN. Smaller forces can suffice in the case of lower requirements placed on production speed or in the case of a lower overdimensioning of the dowel. It has been seen that a tension of the dowels in the finished component can then be achieved in a secure manner when the sum total of pressures applied over large surface areas and pressures applied locally about the driving-in position is at least half of this force. Especially preferably, the tensioning can be larger than the driving forces of the dowels.

It has been noticed that it is advantageous when the dowels are compressed prior to driving in to a size which is only slightly larger than the cross section of the bores. The force between dowel and the surrounding boards consists of two components, which are on the one hand the force which arises already from the difference in dimension during the driving in and on the other hand from the additional force which arises when the dowel tries to expand from the originally compressed state.

It is especially advantageous when the dowels are sprayed with a sliding and/or bonding agent before being driven in. Casein is used for example as such a sliding and bonding agent. Ideally, it is ensured by spraying the dowels that the driving is facilitated as a result of the reduced frictional forces, bonding between dowels and boards is increased in the end state and, most of all, an immediate swelling is produced as a result of the increased humidity directly after driving in the dowels. This leads to the consequence that the component can be subjected to higher loads directly after doweling and can therefore be manipulated more easily in the production process. As an alternative to this, it is also possible to introduce the dowels in a dry manner (without lubricant) into the bores, which enables a simplification of the production process.

An especially advantageous embodiment of the method in accordance with the invention provides that, when the bores are drilled by drill bits having scavenging passage extending in the longitudinal direction a scavenging medium is introduced therethrough during drilling such as compressed air. It is relevant for performing the method in an economical way to introduce a large number of bores in a short period of time. Since the thickness of the components can be up to 400 mm and more, the introduction of the bores is problematic, especially when this should occur in a single pass. Blockages of the conveying grooves of twist drills and strong heating of the drill bits occur, leading to an impairment of the wood material in the area of the bore. This leads to an impaired seating of the dowels. By introducing a scavenging medium along the longitudinal axis of the bore, it is possible on the one hand to prevent blockages of the spiral ducts, so that chips can be removed securely. Moreover, an impairment of the bore wall is prevented by the cooling effect.

The present invention further relates to a panel-type component which consists of several layers of boards of different orientation which are connected with each other without glue by dowels extending substantially transversally to the plane of the panel.

The dowels in the component in accordance with the invention need not all extend exactly normally to the plane of the panel. In various applications such as elements subjected primarily to bending stresses, for example as are used in the area of ceilings, it may be advantageous to also introduce dowels in an oblique position. The advantages as explained above may also be achieved in components of this type.

It is provided in accordance with the invention that the dowels have a tension in the longitudinal direction. The inner tensional state of the component ensures, as described above, a substantial increase in the strength, as well as the leak-proofness of the component. Preferably, the component in accordance with the invention is characterized in that the boards of adjacent layers are pressed against each other by the dowels in an approximately planar state. The relevant aspect is that this state that lies approximately planar above one another is also achieved in cases where the boards are not delimited prior to processing by an exactly plane and parallel surface.

The present invention further relates to an apparatus for producing a component of the kind mentioned above with drills for producing bores which extend substantially transversely to the plane of the panel and with stamps for pressing the dowels into the bores.

In accordance with the invention, this apparatus is characterized in that means are provided for compressing the components in the axial direction of the bores. The compression can occur globally on the one hand, i.e. over a large surface area, such that the individual layers of the massive wood components of a component to be doweled are tensioned by respective tensioning elements by pressing beams transversally to the plane of the component. Typical surface pressures lie between 5 N/cm$^2$ and 30 N/cm$^2$. It has proven to be especially advantageous however to perform the compression locally, i.e. in the area around the dowel with higher pressing pressures. Surface pressing typically can be between 30 N/cm$^2$ and 200 N/cm$^2$ and is preferably at approximately 100 N/cm$^2$. It is advantageous when the means for compressing the components are arranged as stamps which each enclose the bores. Pressing is achieved for example by stamps with an annular pressing surface which are pressed centrally about each bore against the workpiece.

An optimum can be achieved by a combination of these two kinds of compression. Not only are the individual pieces to be joined kept exactly in the desired position so that warping on the finished component is avoided for example, but the type of transfer of forces by the dowels is especially changed to a relevant extent for example. Shearing forces in the plane transversally to the axis of the dowels are no longer primarily transferred by shearing to the dowels, but relevantly by frictional forces between the individual layers of the pieces to be joined which are based on normal forces which are caused by tensions in the dowels.

The apparatus in accordance with the invention can be arranged in various ways. Most advantageously it is characterized by a portal on which the apparatuses for drilling and for pressing in the dowels are arranged. The individual components are guided through the portal step by step and processed. Alternatively, it is similarly possible to move a displaceable portal over the components. As an alternative to such portals or in addition to these, it is possible to provide robots which make the bores and press in the dowels. It may be especially advantageous in connection with a portal for example to provide robots and to introduce dowels inclined to the normal direction of the plane of the panel.

The present invention will now explained below in greater detail by reference to the embodiments shown in the drawings.

DETAILED DESCRIPTION OF THE PREFERRED EMBODIMENTS

Figure 1:
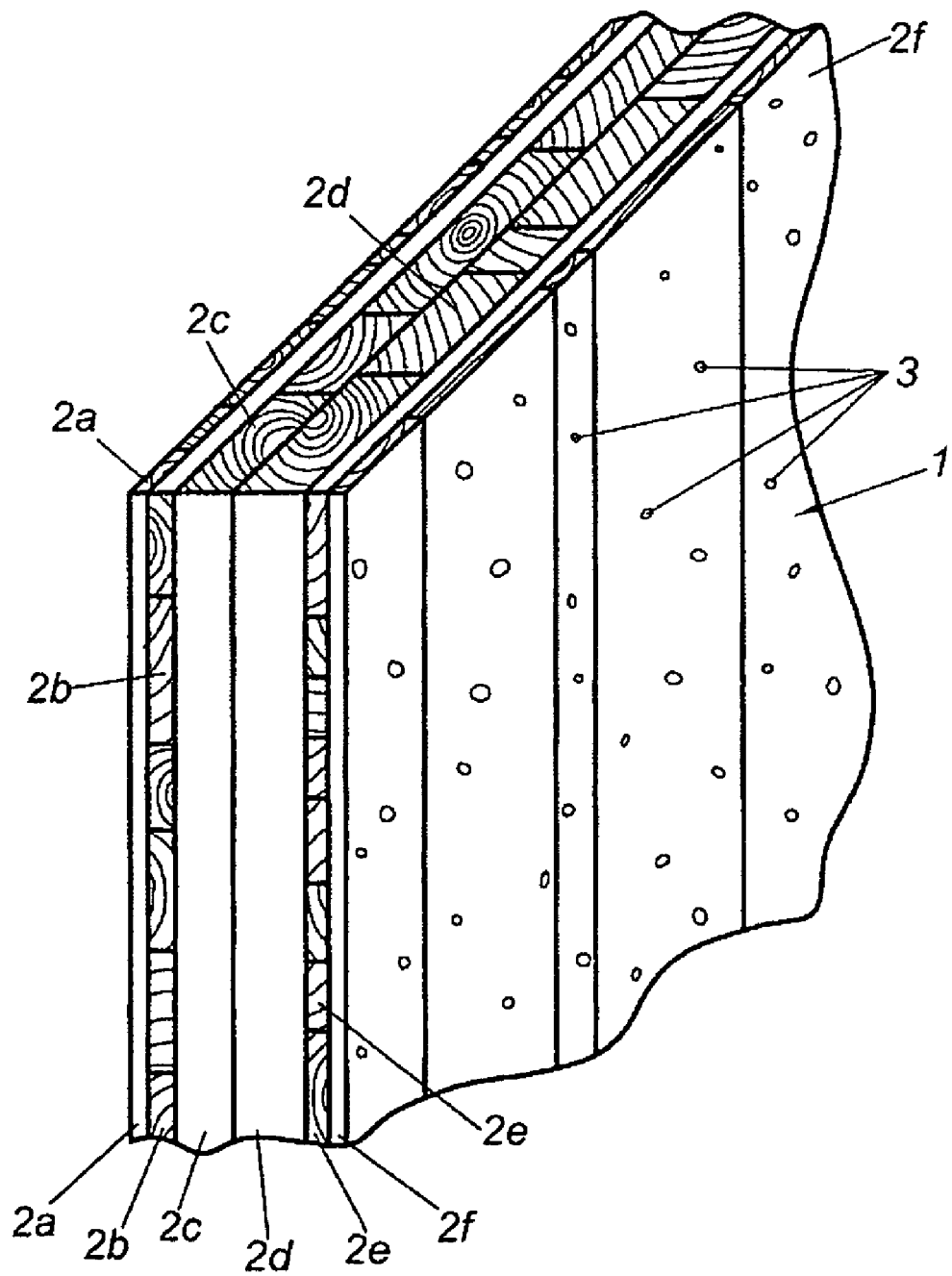
FIG. 1 shows the principal arrangement of a panel-type component.

The panel-type component 1 which is shown in FIG. 1 consists of a total of six layers of boards 2a, 2b, 2c, 2d, 2e, 2f which are arranged in different orientations with respect to each other. The boards 2a, 2b, 2c, 2d, 2e, 2f are joined with each other without glue by dowels 3.

Figure 2:
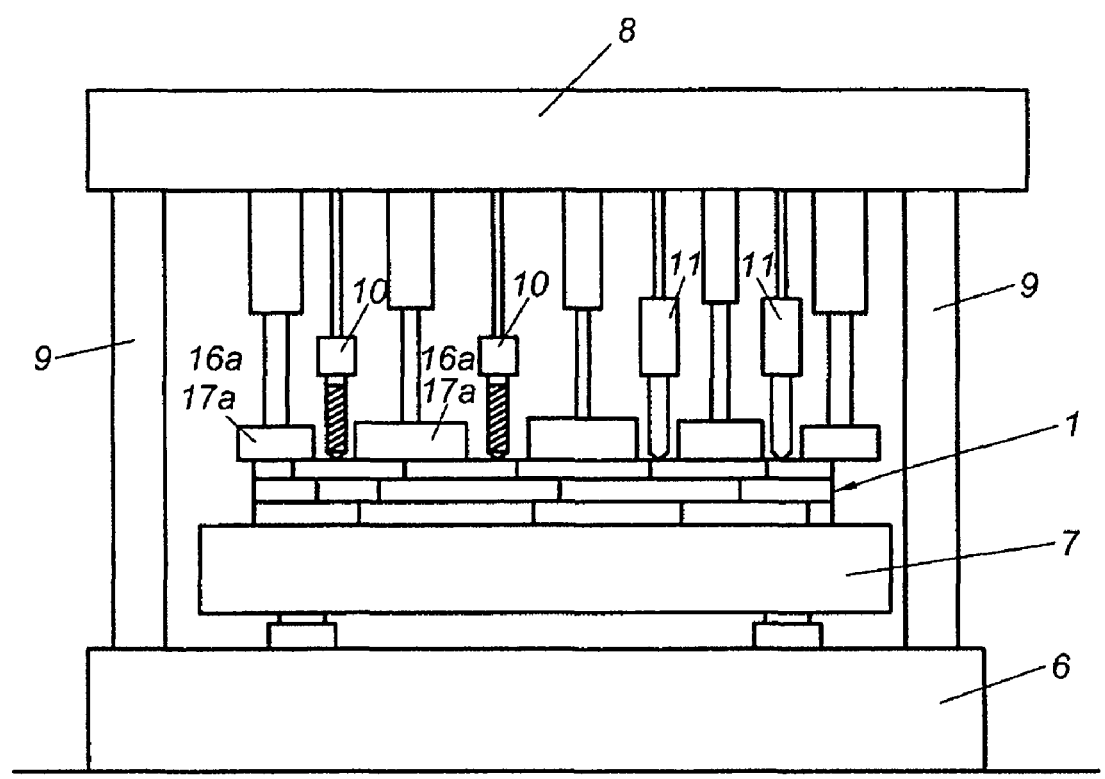
FIG. 2 schematically shows the arrangement of an apparatus.

FIG. 2 shows the principal arrangement of an apparatus in accordance with the invention. A carriage 7 which is displaceable in the longitudinal direction is arranged on the machine bed 6, on which the panel-type components 1 are placed. A device carrier 8 in the form of a portal is fixed above the carriage 7, which carrier is supported by pillars 9. Drilling devices 10 on the one hand and dowel driving apparatuses on the other hand are incorporated on the device carrier 8. It is thus possible that a plurality of bores is introduced in the component 1 in a few job steps. It is similarly possible to press in several dowels simultaneously into the previously produced bores. The pressing in occurs for example pneumatically with a pressure of 120 bar at a dowel diameter of 20 mm.

In order to achieve and improve the strength of the component 1 to meet static requirements, which component is arranged as a massive wood component, dowels 3 are mechanically compacted prior to the mechanical pressing into the component 1, so that their diameter decreases by 2% to 20%. Such dowels 3 will swell more strongly after the pressing into bores 5 of component 1 than conventionally milled wood dowels, even if they are introduced in a drier state than the wood of component 1. In addition, the diameters d of the bores 5 can be provided with a smaller arrangement than the diameter D of dowel 3. The difference between the diameter D of dowel 3 and the diameter d of bores 5 can be up to 20% of the diameter d of the bores 5. The dowels 3 are pressed mechanically into the bores 5 which are provided with a smaller diameter.

It is known to increase the frictional connection of the dowels 3 relative to the ambient wood layers by humidity difference (technical pre-drying of dowels 3). This effect can also be applied in the method in accordance with the invention. This leads to the ecological, technical and economical advantage that conventional synthetic gluing of the dowel 3 or mechanical aids such as wedging on the face side, etc. can be omitted.

In order to improve the sliding capability during the pressing process, water or also a gluing fluid as an additional static security means can be sprayed on. The composition of said fluid can consist of ingredients that are safe for foods within the terms of a product that is compatible with ecological building standards. The pre-pressed dowel 3 can also be introduced in a dry state into the component 1.

During the drilling and doweling, the boards 2a, 2b, 2c, 2d, 2e, 2f of the component 1 are pressed downwardly and clamped by the clamping elements 16a, 16b. Any bulging or warping or other curvatures of the individual boards 2a, 2b, 2c, 2d, 2e, 2f are eliminated in this process and an approximately planar position is produced. The clamping is released only after the dowels 3 have been driven in.

Figure 3:
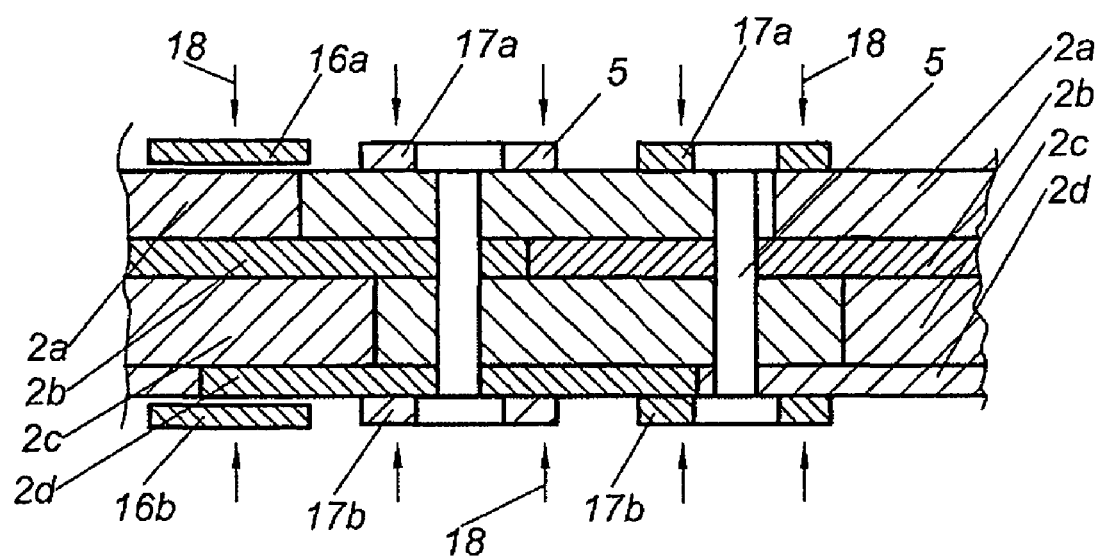
FIG. 3 shows a detail of the embodiment of FIG. 2.

FIG. 3 shows that the means for clamping are arranged on the one hand as pressing beams 16a for pressing over a large surface area and on other hand as annular stamps 17a. The annular stamps 17a are arranged concentrically about the bores 5 to be produced and ensure an especially favourable pressing in the direction of arrows 18 in this critical region. Reference numerals 16b and 17b indicate respective counterholders which can also be integrated in table 7.

Figure 4:
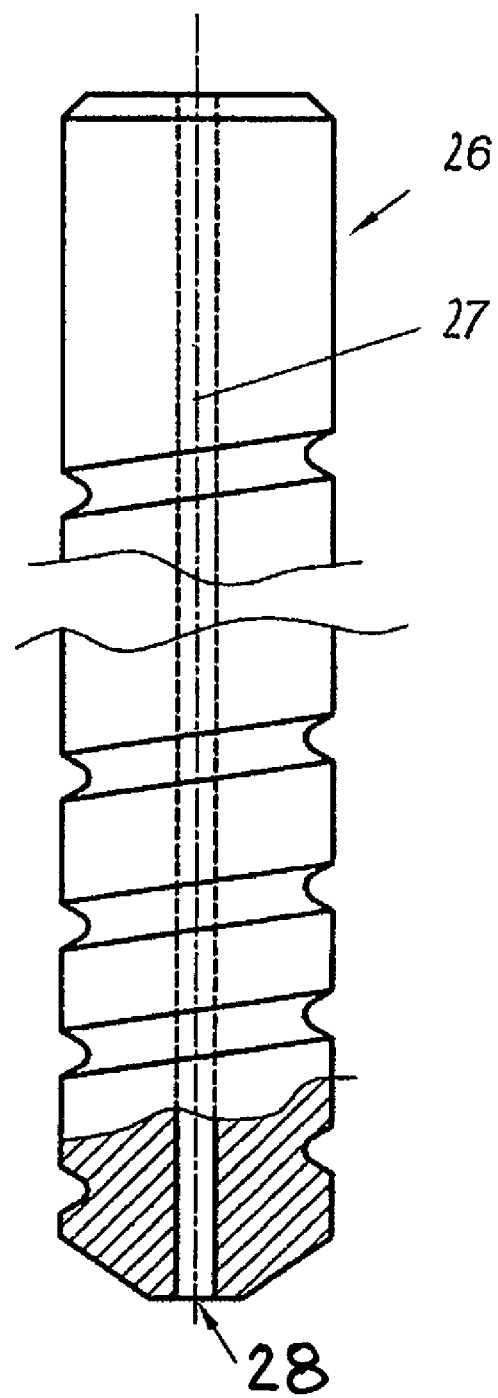
FIG. 4 shows a drill bit on an enlarged scale.

FIG. 4 shows a drill bit 26 which is especially suitable for use in the apparatus in accordance with the invention. Drill bit 26 is arranged per se in the form of a conventional twist drill, but has a scavenging duct 27 extending in the longitudinal direction which opens forwardly at the tip of the drill bit into an opening 28. In this way, a liquid or gaseous scavenging medium can be blown forwardly which cools the drill bit 26 and removes the chips.

It is possible with the method in accordance with the invention and the apparatus in accordance with the invention to produce panel-type components of high strength in a simple and cost-effective way.

The invention claimed is:

1. A method for producing a panel-type component having at least three layers of boards disposed parallel to a plane of the component, with the boards of the at least three layers being connected to one another without glue by dowels which extend substantially transversely to the plane of the component, comprising the steps of:
   (a) placing at least three layers of boards on top of each other so that the boards in adjacent layers extend in different directions,
   (b) applying a compressive force to the at least three layers of board so that the at least three layers of boards are tensioned against each other,
   (c) drilling a plurality of bores through the boards of the at least three layers of boards of step (b),
   (d) providing a plurality of dowels which have been compacted in a radial direction, and
   (e) inserting the radially compacted dowels of step (d) into said bores while the boards of the at least three layers of boards are compressed so as to connect the boards of the at least three layers of boards together.

2. The method according to claim 1, wherein in step (d) the boards are surface compressed with compressive forces such that individual boards of adjacent layers rest in an approximately planar manner next to each other.

3. The method according to claim 2, wherein the compressive forces produce a surface pressing which is at least twice as large as is necessary to result in the individual boards of adjacent layers resting in an approximately planar manner next to each other.

4. The method according to claim 3, wherein the applied compressive forces are larger than half a sum total of forces necessary to drive in the dowels.

5. The method according to claim 4, wherein the applied compressive forces are at least as large as the sum total of forces which are applied to drive in the dowels.

6. The method according to claim 5, comprising tensioning the boards during step (c).

7. The method according to claim 6, wherein tensioning occurs in the direction of the plane of the component in addition to the tensioning perpendicular to the plane of the component.

8. The method according to claim 7, wherein in step (d) the dowels are compressed to a size that is slightly larger than the cross section of the bores.

9. The method according to claim 8, including a step of spraying the dowels with a sliding and/or bonding agent prior to step (e).

10. The method according to claim 8, wherein in step (e) the dowels are introduced without lubricant into the bores.

11. The method according to claim 10, wherein in step (c) the bores are drilled with drill bits having scavenging passage extending in their longitudinal direction and through which a scavenging medium is introduced during drilling.

\* \* \* \* \*